April 8, 1924.
S. S. AMICK
1,489,728
AUTOMOBILE HEADLIGHT
Original Filed May 25, 1922
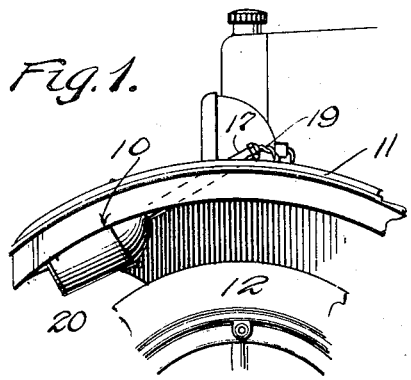
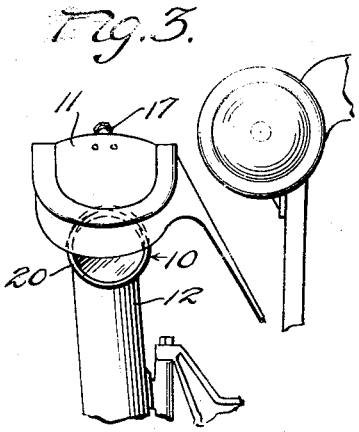
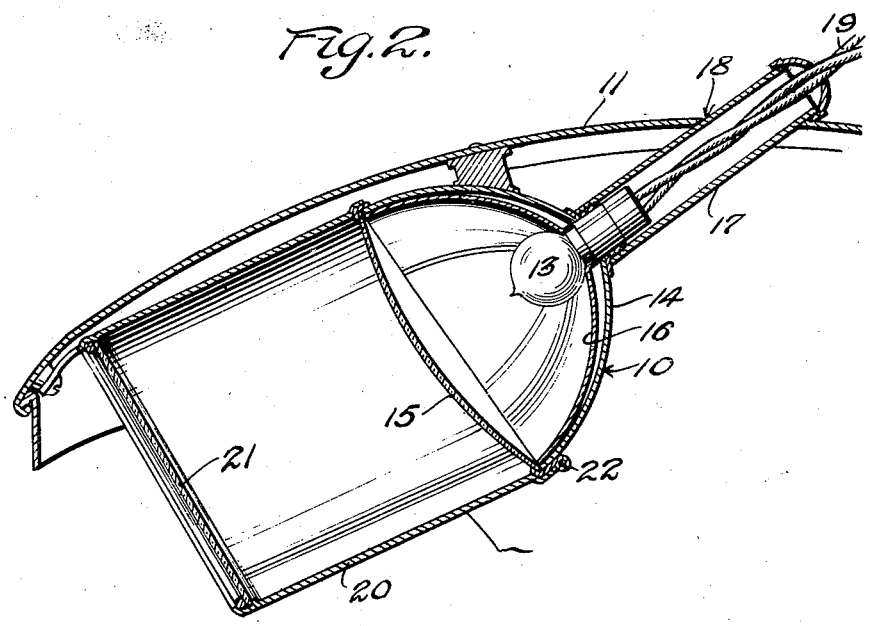
Inventor
Samuel S. Amick
By
Attorney Patented Apr. 8, 1924.

1,489,728

UNITED STATES PATENT OFFICE.

SAMUEL S. AMICK, OF TIPTON, INDIANA.

AUTOMOBILE HEADLIGHT.

Application filed May 25, 1922, Serial No. 563,597. Renewed November 1, 1923.

*To all whom it may concern:*

Be it known that I, SAMUEL S. AMICK, a citizen of the United States, residing at Tipton, in the county of Tipton, State of Indiana, have invented certain new and useful Improvements in Automobile Headlights; and I do hereby declare the following to be a full, clear, and exact description of the invention, such as will enable others skilled in the art to which it appertains to make and use the same.

The object of the invention is to provide a headlight dimmer lamp adapted for use in connection with motor vehicles and designed particularly for use in alternation with the usual conventional headlights, for example, under such conditions as when the usually powerful headlights are turned off or switched out by any suitable mechanism known to the art, the dimmer lamps may be switched into circuit either simultaneously or independently to afford a sufficient light on the road to enable the driver of the car to properly manipulate and steer the vehicle without causing a glare in the eyes of the operator of an approaching vehicle; or in other words, to provide for use in connection with motor vehicles an alternative headlight construction which may be used in emergencies to guide the driver of the car without being open to the objections charged against headlights of a construction not adapted for the direction and protection of the light and which does not involve the inconvenience and expense of portable lights having dimming devices applied to or constituting a structural feature of the same; and with these general objects in view, the invention consists in the construction and arrangenemt of parts of which the preferred embodiment is illustrated in the accompanying drawing, wherein;

Figure 1 is a side view of a portion of an automobile showing a headlight dimmer lamp embodying the invention arranged in operative relation therewith.

Figure 2 is a longitudinal sectional view of the lamp and the adjacent portions of the front wheel guard.

Figure 3 is a front view of the device.

The invention consists essentially in providing a lamp 10 with means whereby it may be supported beneath the front wheel guard 11 and above the wheel 12, and in proper relation with the front end of the wheel guard as to adapt the latter at its downwardly and forwardly curved portion to intercept the horizontal light rays projected from the light unit such as the globe 13 of the lamp arranged within a suitable case 14, having the lens 15 and reflector 16.

In the construction illustrated the casing is provided with a rearwardly extending stem 17, adapted to project through an opening 18 in the wheel guard and of a tubular construction so as to permit of the passage therethrough of the wires or conductors 19 in circuit with a suitable source of energy, such as the lighting system of the car, and under the control of suitable switches of which no specific illustration is deemed necessary, but which may be arranged to suit the convenience of the operator or the designer of the vehicle to adapt the dimmer lamp to be switched in and out of circuit either independently of or simultaneously with the reverse operation of the connections with the main headlight lamps.

As a means for protecting the lamp and more particularly the lens thereof and of concentrating the light rays upon that portion of the road which is directly in advance of the car carrying the apparatus, a cylindrical shield 20 is arranged in a forwardly and downwardly directed position from the plane of the lens and is provided at its forward end with a light penetrable disk 21. This shield not only protects the lamp lens from mud thrown by the wheel, but serves to cut off and confine the light rays so that they may be directed only into the path of the vehicle wheels. Furthermore, the shield may be movably mounted on the lamp casing by hinging the same at 22 to permit of displacement in order to give access to the interior of the lamp casing.

It will obviously be understood that a lamp of the type indicated as forming the subject matter of the invention may be arranged in relation to each front wheel guard so that shafts or columns of light may be directed in the paths of both front wheels of the vehicle as a means of enabling the driver of the car to avoid obstructions in the road.

What is claimed is:

The combination with the front fender of an automobile of a dimmer lamp slantingly supported beneath the fender and above the wheel, the lamp casing being provided with a rearwardly and upwardly slanting stem for extension through an opening in the wheel guard, the downwardly and forwardly directed front end of the fender depending beneath the top of the lamp to intercept the horizontally projected light rays proceeding from the light unit.

In testimony whereof, I affix my signature, in the presence of two witnesses.

SAMUEL S. AMICK.

Witnesses:
A. F. BINDE,
F. W. NISSEN.